(12) United States Patent
You et al.

(10) Patent No.: US 11,075,492 B2
(45) Date of Patent: Jul. 27, 2021

(54) ADAPTER AND ELECTRONIC SYSTEM HAVING THE SAME

(71) Applicant: SAMSUNG ELECTRONICS CO., LTD., Suwon-si (KR)

(72) Inventors: Tae Jun You, Suwon-si (KR); Sung Yong Joo, Suwon-si (KR); Seong Ho Park, Suwon-si (KR); Sang Goo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/675,627

(22) Filed: Nov. 6, 2019

(65) Prior Publication Data

US 2020/0144775 A1 May 7, 2020

(30) Foreign Application Priority Data

Nov. 6, 2018 (KR) .................. 10-2018-0135392

(51) Int. Cl.
*H01R 31/00* (2006.01)
*H01R 31/06* (2006.01)
(Continued)

(52) U.S. Cl.
CPC ............ *H01R 31/065* (2013.01); *G06F 1/26* (2013.01); *H01R 13/6675* (2013.01); *H01R 24/20* (2013.01)

(58) Field of Classification Search
CPC .. H01R 31/065; H01R 24/20; H01R 13/6675; H01R 2201/18; H01R 13/6315;
(Continued)

(56) References Cited

U.S. PATENT DOCUMENTS 5,593,323 A * 1/1997 Dernehl ................. H01R 24/58
439/668
5,885,109 A * 3/1999 Lee ....................... H01R 13/514
439/131
(Continued)

FOREIGN PATENT DOCUMENTS

EP 0122565 12/1987
JP 2001-68223 3/2001
(Continued)

OTHER PUBLICATIONS

International Search Report dated Feb. 26, 2020 in International Patent Application No. PCT/KR2019/014155.

*Primary Examiner* — Abdullah A Riyami
*Assistant Examiner* — Nelson R. Burgos-Guntin
(74) *Attorney, Agent, or Firm* — Staas & Halsey LLP

(57) ABSTRACT

Disclosed herein is an adapter and an electronic system. The adapter includes a power cable, a converter arranged on one end of the power cable, and a connector arranged on another end of the power cable and configured to be connected to an electronic device, and the connector includes a connector body formed in a cylindrical shape and an inside of which includes a hollow portion, a first adapter terminal arranged on a circumferential surface of the hollow portion of the connector body, and a second adapter terminal arranged on a circumferential surface of the connector body, and configured to have a power capacity different from a power capacity of the first adapter terminal.

19 Claims, 20 Drawing Sheets

(51) Int. Cl.
*H01R 24/20* (2011.01)
*H01R 13/66* (2006.01)
*G06F 1/26* (2006.01)

(58) Field of Classification Search
CPC .............. H01R 12/7088; H01R 24/38; H01R 13/6456; G06F 1/26
USPC ................................ 439/680, 578, 502, 638
See application file for complete search history.

(56) References Cited

U.S. PATENT DOCUMENTS

| | | | |
|---|---|---|---|
| 6,030,247 A | 2/2000 | Sasahara | |
| 6,152,778 A * | 11/2000 | Dalton | H01R 31/06 439/502 |
| 6,283,789 B1 * | 9/2001 | Tsai | H01R 27/02 439/502 |
| 6,321,340 B1 * | 11/2001 | Shin | G06F 1/1632 713/310 |
| 6,379,183 B1 * | 4/2002 | Ayres | H01R 9/0515 439/578 |
| 6,530,085 B1 * | 3/2003 | Perlman | H04N 21/42219 725/82 |
| 6,830,483 B1 * | 12/2004 | Wu | H01R 31/06 439/638 |
| 7,147,519 B2 * | 12/2006 | Reichle | H01R 13/66 439/676 |
| 7,354,301 B2 * | 4/2008 | Noguchi | H01M 2/342 429/1 |
| 7,508,163 B2 * | 3/2009 | Batts-Gowins | H02J 7/342 320/105 |
| 7,686,653 B2 * | 3/2010 | Binder | H01R 31/065 439/638 |
| 7,911,757 B2 * | 3/2011 | Hsu | H01R 25/003 361/118 |
| 7,976,337 B1 * | 7/2011 | Cortopassi | G06F 1/26 439/502 |
| 8,351,302 B2 * | 1/2013 | Fischer | G04C 10/00 368/64 |
| 8,831,257 B2 * | 9/2014 | Lee | H04R 31/006 381/317 |
| 10,103,486 B1 * | 10/2018 | Yan | H01R 13/504 |
| 2002/0137382 A1 * | 9/2002 | Shirakura | H01R 31/06 439/218 |
| 2003/0008550 A1 * | 1/2003 | Tse | H02G 11/02 439/501 |
| 2004/0229498 A1 * | 11/2004 | Fort | H02G 11/00 439/502 |
| 2005/0176268 A1 * | 8/2005 | Zaderej | H01P 1/04 439/55 |
| 2006/0118533 A1 * | 6/2006 | Yunk | H01R 31/06 219/130.1 |
| 2007/0059977 A1 * | 3/2007 | Asante | H01R 13/652 439/502 |
| 2007/0167054 A1 * | 7/2007 | Wu | H01R 33/94 439/238 |
| 2008/0076279 A1 * | 3/2008 | Wu | H01R 31/06 439/131 |
| 2010/0002421 A1 * | 1/2010 | Arnold, III | F21L 4/085 362/183 |
| 2010/0080563 A1 * | 4/2010 | DiFonzo | G06F 1/26 398/115 |
| 2011/0092088 A1 * | 4/2011 | Siebens | H01R 31/06 439/181 |
| 2011/0136389 A1 * | 6/2011 | Huang | H01R 24/78 439/638 |
| 2013/0017703 A1 * | 1/2013 | Gamelsky | H01R 13/6277 439/345 |
| 2016/0172808 A1 * | 6/2016 | Lauby | H01R 13/6675 348/730 |
| 2017/0256899 A1 * | 9/2017 | Mitchell | H01R 13/53 |
| 2019/0125458 A1 * | 5/2019 | Shelton, IV | A61B 34/25 |
| 2020/0144775 A1 * | 5/2020 | You | G06F 1/26 |

FOREIGN PATENT DOCUMENTS

| | | |
|---|---|---|
| KR | 20-0411212 | 3/2006 |
| KR | 10-2016-0066484 | 6/2016 |

* cited by examiner

ADAPTER AND ELECTRONIC SYSTEM HAVING THE SAME

CROSS-REFERENCE TO RELATED APPLICATION(S)

This application is based on and claims priority under 35 U.S.C. § 119 to Korean Patent Application No. 10-2018-0135392, filed on Nov. 6, 2018, in the Korean Intellectual Property Office, the disclosure of which is incorporated by reference herein in its entirety

BACKGROUND

1. Field

The disclosure relates to an adapter and an electronic system having the same, and more particularly, to an adapter having an improved electrical connection structure, and an electronic system having the same.

2. Description of Related Art

In general, electronic devices have different voltages according to the type and the use of the electronic device, and the shape of an input jack to which the power is supplied also differs for each product.

In order to supply power to the electronic devices, it is necessary to provide appropriate voltage power for the electronic devices through a connector having a shape suitable for the input jack, and this function is performed by a power adapter corresponding to a power conversion supply.

Particularly, the power adapter is widely used as a device that converts AC power into DC power and supplies it to various electronic devices such as laptops, Personal Computers (PCs), display monitors, and mobile phones that use DC power. Further, the power adapter is used as a device that generates output power from input power so as to charge a battery and to supply a voltage required to operate electronic devices.

The power adapters is provided with a case, in which an AC/DC conversion circuit is embedded, a plug connected to a power outlet, and a connector connected to an electronic device, and thus the power adapter converters high voltage AC power, which is input through the power outlet, into an appropriate DC power and then supplies the appropriate DC power to the electronic device.

SUMMARY

Therefore, it is an aspect of the disclosure to provide an electronic system capable of preventing an electrical connection when an inappropriate adapter is connected to an electronic device.

It is another aspect of the disclosure to provide an electronic system having improved ease of use when an adapter is connected to an electronic device.

It is another aspect of the disclosure to provide an electronic system capable of facilitating inventory management Additional aspects of the disclosure will be set forth in part in the description which follows and, in part, will be obvious from the description, or may be learned by practice of the disclosure.

In accordance with an aspect of the disclosure, an adapter includes a power cable, a converter arranged on an end of the power cable, and a connector arranged on another end of the power cable and configured to be connected to an electronic device, and the connector includes a connector body formed in a cylindrical shape and an inside of which includes a hollow portion, a first adapter terminal arranged on a circumferential surface of the hollow portion of the connector body, and a second adapter terminal arranged on a circumferential surface of the connector body, and configured to have a power capacity different from a power capacity of the first adapter terminal.

The connector may include a guide protrusion configured to radially protrude from the connector body.

The first adapter terminal may include a first positive adapter terminal, and a first negative adapter terminal, and the first positive adapter terminal may be arranged on one side of the guide protrusion along the circumferential surface of the hollow portion of the connector body and the first negative adapter terminal may be arranged on the other side of the guide protrusion along the circumferential surface of the hollow portion of the connector body.

The second adapter terminal may include a second positive adapter terminal, and a second negative adapter terminal, and the second positive adapter terminal may be arranged on one side of the guide protrusion along the circumferential surface of the connector body and the second negative adapter terminal is arranged on another side of the guide protrusion along the circumferential surface of the connector body.

Before the second positive adapter terminal is connected, the second negative adapter terminal is inserted into the electronic device.

A length of the second positive adapter terminal extending along a longitudinal direction of the connector body may be less than a length of the second negative adapter terminal.

The connector may further include a terminal cover configured to expose a portion of the second adapter terminal while the connector is inserted into the electronic device.

The second adapter terminal may have a power capacity larger than that of the first terminal adapter.

In accordance with another aspect of the disclosure, an electronic system includes an electronic device provided with an input jack including a first input terminal and a second input terminal having a capacity different from a capacity of the first input terminal, and an adapter provided to supply power to the electronic device and including a connector including a first adapter terminal configured to be electrically connected to the first input terminal, and a second adapter terminal configured to be electrically connected to the second input terminal and configured to have a power capacity different from a power capacity of the first adapter terminal.

When the electronic device requires a first power capacity, the electronic device may be supplied with power through the first input terminal, and when the electronic device requires a second power capacity, the electronic device may be supplied with power through the second input terminal.

The input jack may include an insertion groove into which the connector is insertable, and a center pole arranged at the center of the insertion groove, and the first input terminal may be arranged on an outer circumferential surface of the center pole, and the second input terminal may be arranged on an inner circumferential surface of the insertion groove.

The connector may be insertable into the input jack, and may include a connector body and an inside of which includes, and the first adapter terminal may be arranged on an inner circumferential surface of the hollow portion of the connector body, and the second adapter terminal may be arranged on an outer circumferential surface of the connector body.

The connector may include a guide protrusion configured to protrude to the radially outer side from the connector body.

The first adapter terminal may include a first positive adapter terminal, and a first negative adapter terminal, and the first positive adapter terminal may be arranged on one side of the guide protrusion along the circumferential surface of the hollow portion of the connector body and the first negative adapter terminal may be arranged on another side of the guide protrusion along the circumferential surface of the hollow portion of the connector body.

The second adapter terminal may include a second positive adapter terminal, and a second negative adapter terminal, and the second positive adapter terminal may be arranged on one side of the guide protrusion along the circumferential surface of the connector body and the second negative adapter terminal may be arranged on another side of the guide protrusion along the circumferential surface of the connector body.

The first adapter terminal may be arranged on one side of the guide protrusion along a circumference of the connector body, and the second adapter terminal may be arranged on the other side of the guide protrusion along the circumference of the connector body.

The second input terminal may have a power capacity larger than a power capacity of the first input terminal.

The input jack may include an insertion groove into which the connector is rotatably insertable and a guide groove configured to limit a range of a rotation of the connector.

The guide groove may be configured to allow the rotation of the connector to be within a range in which the connector maintains an electrical connection with the input jack.

The first input terminal may be arranged on one side of the guide groove along a circumferential direction of the insertion groove and the second input terminal may be arranged on the other side opposite to the one side of the guide groove along the circumferential direction of the insertion groove.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
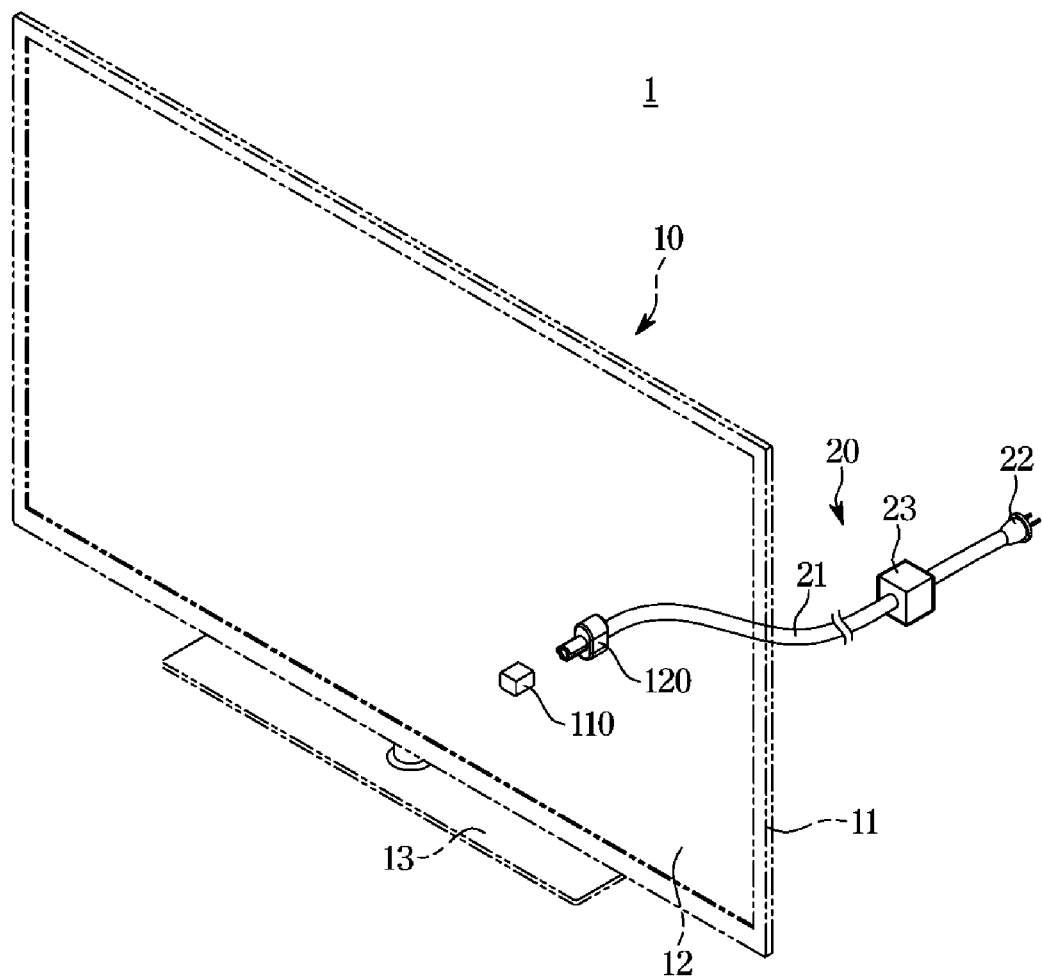
FIG. 1 is a view schematically illustrating an electronic system according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front end", "left and right side" and the like may be defined by the drawings, but the shape and the location of the component is not limited by the term.

The disclosure will be described more fully hereinafter with reference to the accompanying drawings FIG. 1 is a view schematically illustrating an electronic system according to an embodiment of the disclosure.

Referring to FIG. 1, an electronic system 1 may include an electronic device 10 and an adapter 20.

The electronic device 10 may be driven by receiving power through the adapter 20. Hereinafter for convenience of description, a display apparatus will be described as an example of the electronic device 10. However, an input jack according to an embodiment of the disclosure is applied to the display apparatus, but is not limited thereto. Therefore, the input jack may be applied to any device as long as requiring power supply such as a computer and a notebook.

The electronic device 10 may include a housing 11, a display unit 12, and a stand 13.

Electronic components may be placed in the housing 11. The display unit 12 may be configured to display information to a user. The stand 13 may support the electronic device 10.

The electronic device 10 may include an input jack 110 configured to receive power for the drive. The electronic device 10 may transmit and/or receive data, a control signal, or a power signal through the input jack 110. Details of the input jack 110 will be described later.

FIG. 1 illustrates that the input jack 110 is arranged on the rear surface of the electronic device 10, but the position of the input jack 10 is not limited thereto. The input jack 110 may be arranged on the top, bottom, or left and right sides of the electronic device 10.

The adapter 20 may be configured to supply a power voltage to the electronic device 10. The adapter 20 may include a power cable 21, a plug 22, a converter 23, and connectors 120 and 130. The converter 23 may receive a power supply voltage through the plug 22 connected to an outlet (not shown), and convert the power supply voltage into a voltage appropriate for the electronic device 10, and then transmit the power to the connectors 120 and 130 through the power cable 21.

The connectors 120 and 130 may be arranged at one end of the adapter 20. The connectors 120 and 130 may be connected to the input jack 110 of the electronic device 10. The connectors 120 and 130 may transfer the power voltage, which is transferred through the power cable 21, to the input jack 110. Details of the connectors 120 and 130 will be described later.

Figure 2:
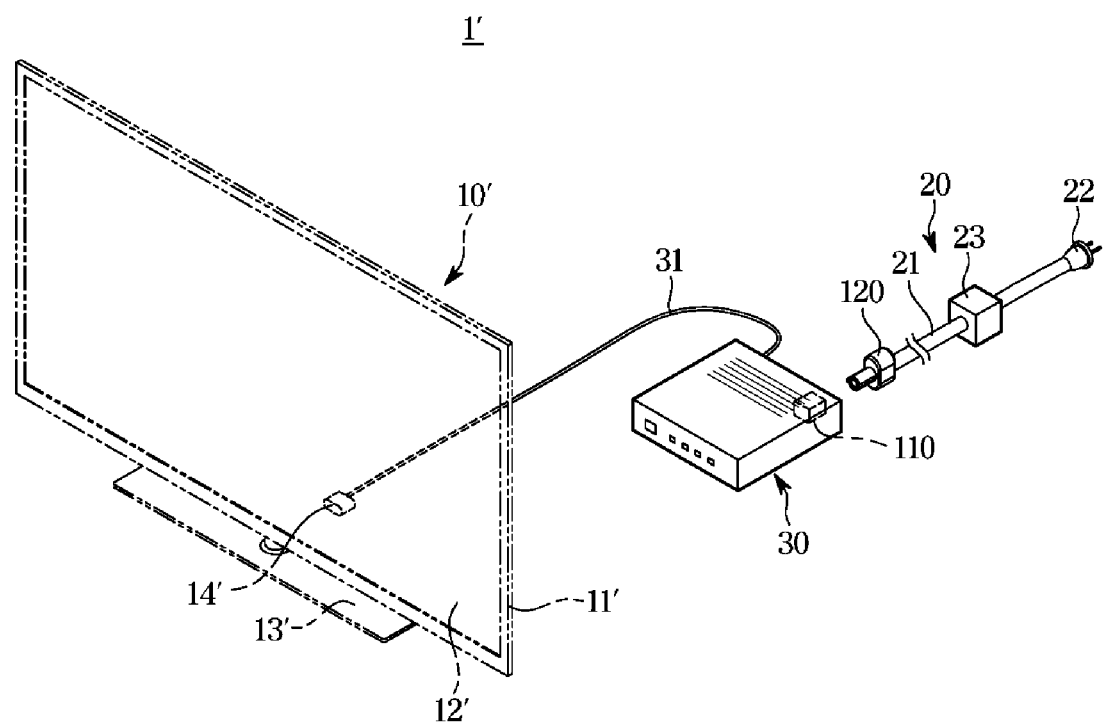
FIG. 2 is a view schematically illustrating an electronic system according to an embodiment of the disclosure.

FIG. 2 is a view schematically illustrating an electronic system according to another embodiment of the disclosure.

In describing an electronic system 1' shown in FIG. 2, the same components as those in the embodiment shown in FIG. 1 have the same reference numerals, and detailed descriptions thereof may be omitted.

Referring to FIG. 2, the electronic system 1' may include an electronic device 10', an adapter 20, and a one connect box 30. The electronic system 1' shown in FIG. 2 may further include the one connect box 30, unlike the electronic system 1 shown in FIG. 1.

The electronic device 10' may include a housing 11', a display unit 12', a stand 13', and a connecting portion 14'. The configuration of the housing 11', the display unit 12' and the stand 13' is the same as that of the housing 11, the display unit 12 and the stand 13 shown in FIG. 1, and thus a description thereof will be omitted.

The connecting portion 14' may be electrically connected to a connection cable 31. The electronic device 10' may receive a signal and/or power from the one connect box 30 through the connecting portion 14'.

The one connect box 30 may be connected to the electronic device 10' through the connection cable 31. At least one cable for being connected to the electronic device 10' may be connected to the one connect box 30. That is, the electronic device 10' may receive an external signal through the one connect box 30 corresponding to a medium.

The adapter 20 may be connected to the one connect box 30. The adapter 20 may provide power to the one connect box 30. The one connect box 30 may be provided with an input jack 110, and the adapter 20 may be inserted into the input jack 110 to be electrically connected to the one connect box 30.

Figure 3:
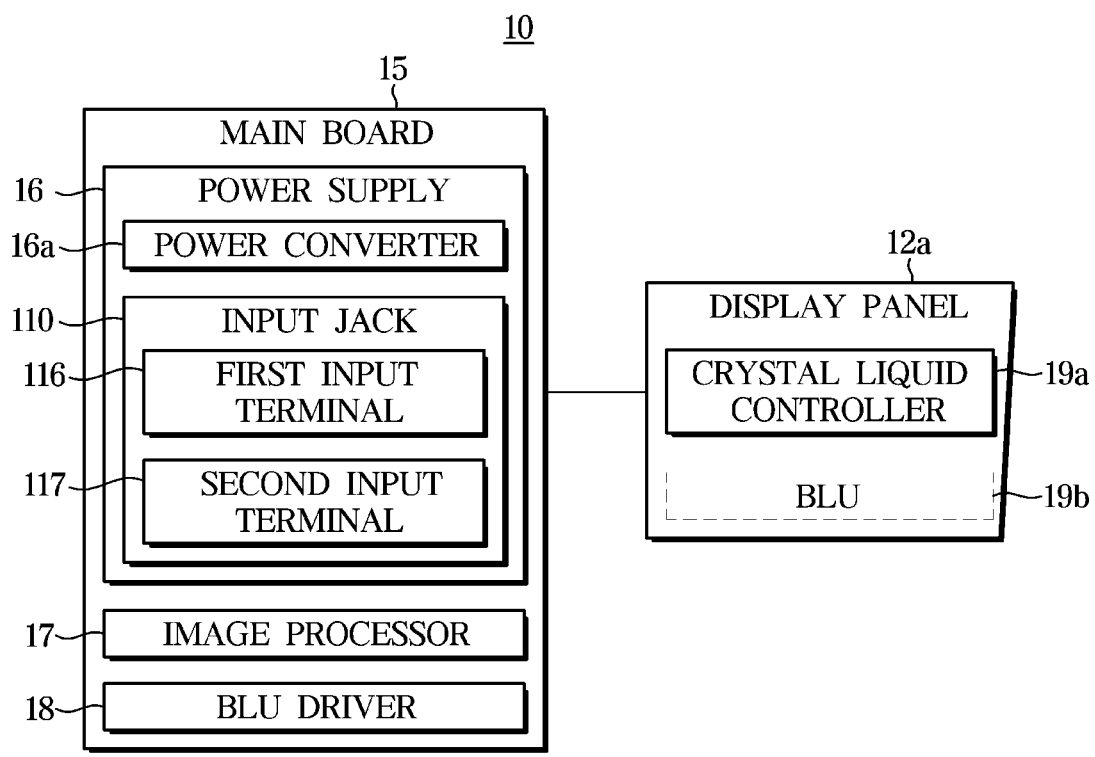
FIG. 3 is a block diagram schematically illustrating a configuration of the electronic device shown in FIG. 1.
Figure 4:
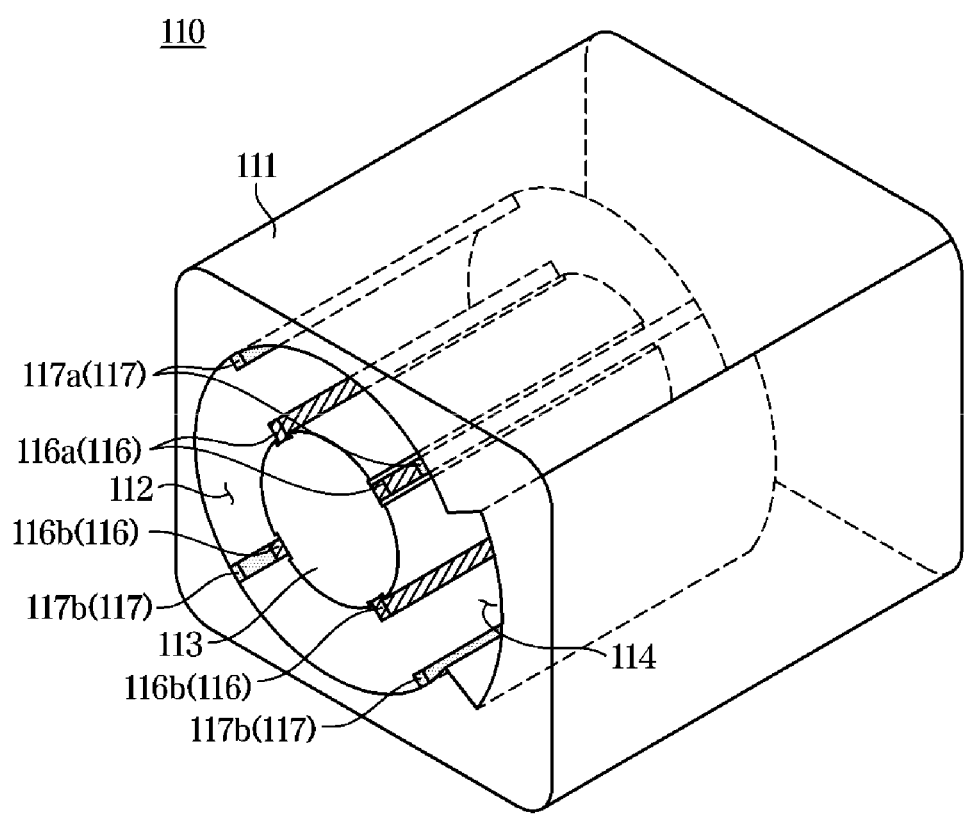
FIG. 4 is a perspective view of an input jack shown in FIG. 1.
Figure 5:
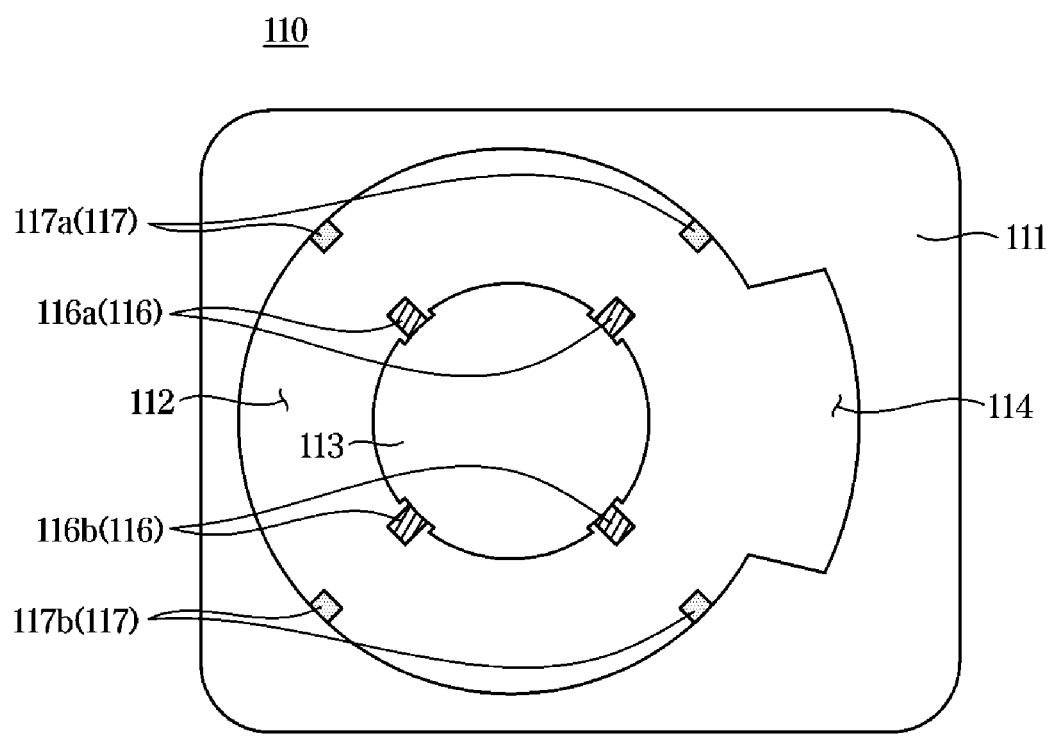
FIG. 5 is a plan view of the input jack shown in FIG. 4.

FIG. 3 is a block diagram schematically illustrating a configuration of an electronic device shown in FIG. 1. FIG. 4 is a perspective view of an input jack shown in FIG. 1. FIG. 5 is a plan view of the input jack shown in FIG. 4.

Referring to FIG. 3, the electronic device 10 may include a main board 15 and a display panel 12a. The main board 15 may receive power from the outside to control the operation of the electronic device 10. The main board 15 may include a power supply 16, an image processor 17, and a backlight unit (BLU) driver 18.

The power supply 16 may include a power converter 16a and the input jack 110. The power converter 16a may convert power, which is received from the input jack 110, into power that is appropriate for the electronic device 10.

The image processor 17 may receive power from the power converter 16a and perform image processing on an image to be displayed on the electronic device 10.

The BLU driver 18 may drive a backlight unit (BLU) 19b by using power transmitted from the input jack 110.

The electronic device 10 may receive power through a first input terminal 116 or a second input terminal 117 according to required power capacity. Particularly, when the electronic device 10 according to an embodiment of the disclosure requires a relatively low power capacity, the electronic device 10 may receive power through the first input terminal 116. The first input terminal 116 may be connected to the power converter 16a. The power converter 16a may be not electrically connected to the second input terminal 117. The first input terminal 116 may have a first capacity which is a relatively low power capacity. The first input terminal 116 may have a lower power capacity than the second input terminal 117. The electronic device 10 may be provided with an input jack 110 configured to transmit the power supplied from the adapter 20 to the power converter 16a.

On the other hand, when the electronic device 10 requires a relatively high power capacity, the electronic device 10 may receive power through the second input terminal 117. The second input terminal 117 may be connected to the power converter 16a. The power converter 16a may not be electrically connected to the first input terminal 116. The second input terminal 117 may have second a capacity which is a relatively high power capacity. The second capacity may be set greater than the first capacity. The second input terminal 117 may have a higher power capacity than the first input terminal 116. The electronic device 10 may be provided with an input jack 110 configured to transmit the power supplied from the adapter 20 to the power converter 16a.

According to the disclosure, the input jack 110 having the same configuration may be used for both of the low power capacity electronic device 10 and the high power capacity electronic device 10.

A liquid crystal controller 19a may receive power from the power converter 16a to control the display panel 12a contained in the display unit 12. The liquid crystal controller 19a may drive the display panel 12a.

The backlight unit 19b may be provided in the display panel 12a. The display panel 12a may not include the backlight unit 19b.

Referring to FIGS. 4 and 5, the input jack 110 may be configured to receive power for driving the electronic device 10. The input jack 110 may include a jack body 111, an insertion groove 112, a center pole 113, the first input terminal 116, and the second input terminal 117.

The insertion groove 112 may be formed inside the jack body 111. The insertion groove 112 may be provided in a shape and/or size corresponding to connector bodies 122 and 132 of the connectors 120 and 130 to allow the connector bodies 122 and 132 of the connectors 120 and 130 to be inserted thereinto. The insertion groove 112 may rotatably support the connector bodies 122 and 132. The connector bodies 122 and 132 of the connectors 120 and 130 may be rotatably inserted into the insertion groove 112.

The center pole 113 may be arranged inside the insertion groove 112. The center pole 113 may be arranged approximately in the center of the insertion groove 112. The insertion groove 112 may be inserted into hollows (hollow portions/parts) 123 and 133 of the connectors 120 and 130 when the connectors 120 and 130 are connected to the input jack 110.

The first input terminal 116 may be electrically connected to the power converter 16a when the input jack 110 is applied to the low power capacity electronic device 10. In this case, the main board 15 may require the first capacity. The first input terminal 116 may extend along a direction to which the connectors 120 and 130 are inserted.

The first input terminal 116 may be arranged on an outer circumferential surface of the center pole 113. The first input terminal 116 may be spaced apart from each other along the outer circumferential surface of the center pole 113. The first input terminal 116 may include a first positive input terminal 116a and a first negative input terminal 116b. The first positive input terminal 116a may be provided in plural. The first negative input terminal 116b may be provided in plural.

The second input terminal 117 may be electrically connected to the power converter 16a when the input jack 110 is applied to the high power capacity electronic device 10. In this case, the main board 15 may require the second capacity larger than the first capacity. The second input terminal 117 may extend along the direction to which the connectors 120 and 130 are inserted. The second input terminal 117 may be electrically separated from the first input terminal 116.

The second input terminal 117 may be arranged on an inner circumferential surface of the insertion groove 112. The second input terminal 117 may be spaced apart from each other along the inner circumferential surface of the insertion groove 112. The second input terminal 117 may include a second positive input terminal 117a and a second negative input terminal 117b. The second positive input terminal 117a may be provided in plural. The second negative input terminal 117b may be provided in plural.

The input jack 110 may further include a guide groove 114. Details of the guide groove 114 will be described later.

The input jack 110 is configured to electrically connect the input terminals 116 and 117 corresponding to the capacity class of the electronic device 10 to the power converter 16a due to this configuration, and thus it is possible to prevent malfunction and damage although an inappropriate connector is connected.

Figure 6:
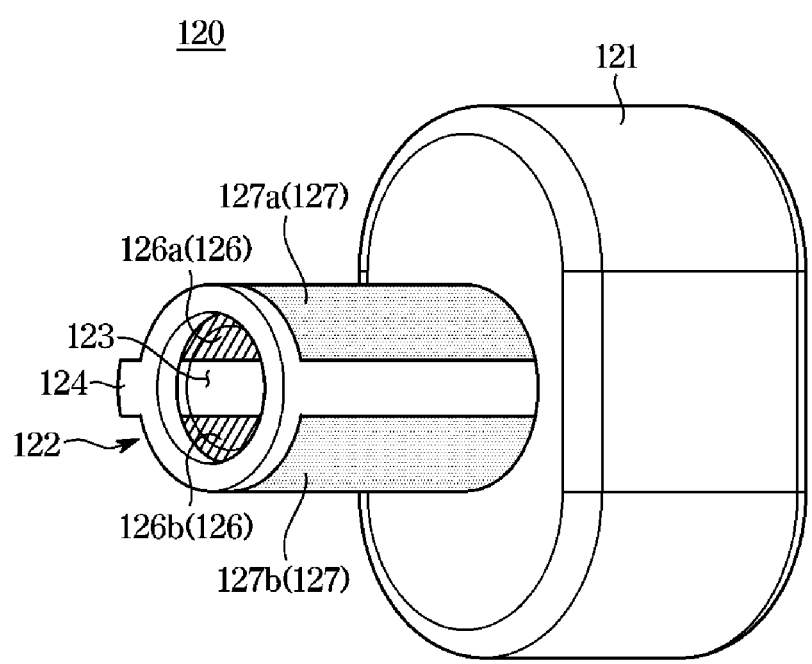
FIG. 6 is a view of a first connector configured to be connected to a low power capacity electronic device, and a high power capacity electronic device.
Figure 7:
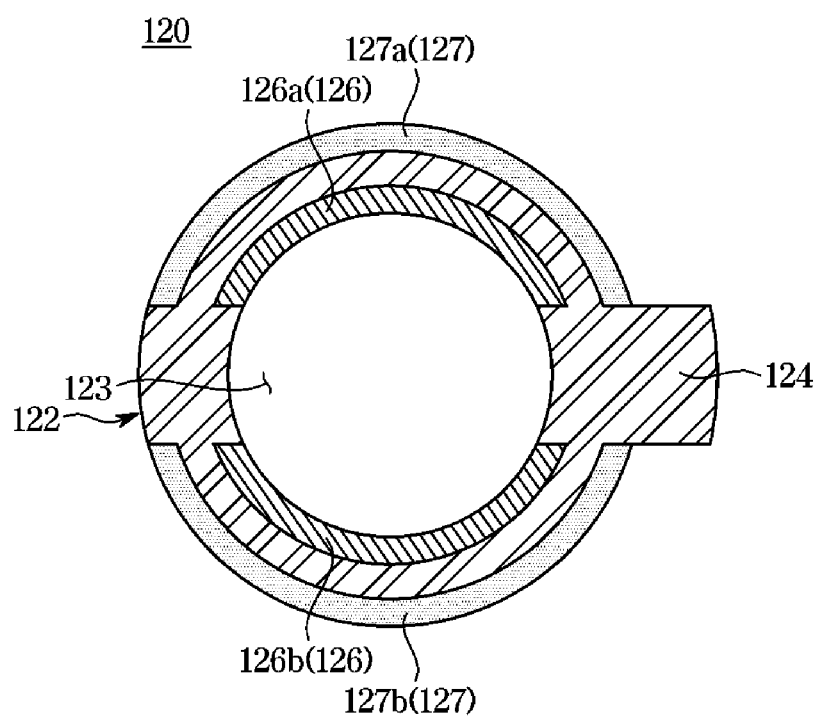
FIG. 7 is a cross-sectional view illustrating a portion inserted into an input jack of the first connector shown in FIG. 6.
Figure 8:
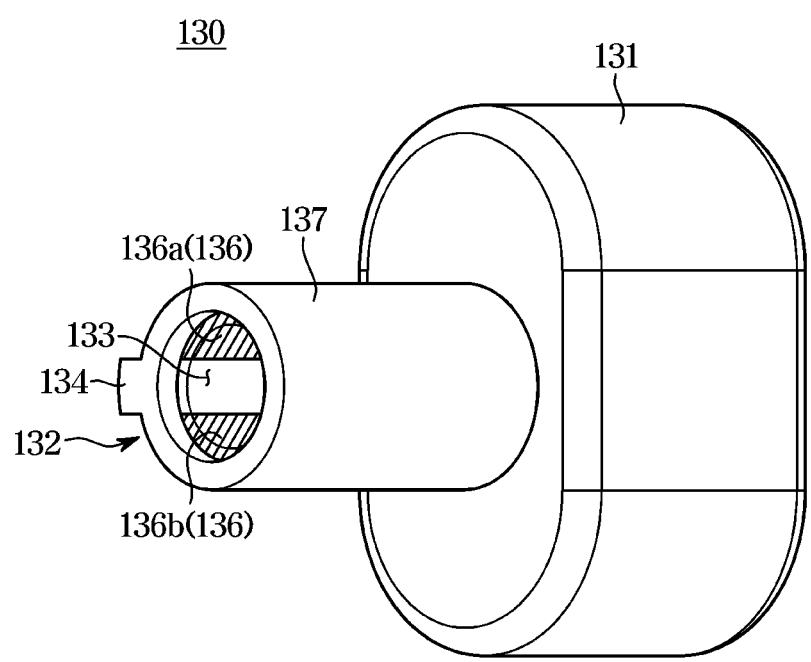
FIG. 8 is a view of a second connector configured to be connected to a low power capacity electronic device.
Figure 9:
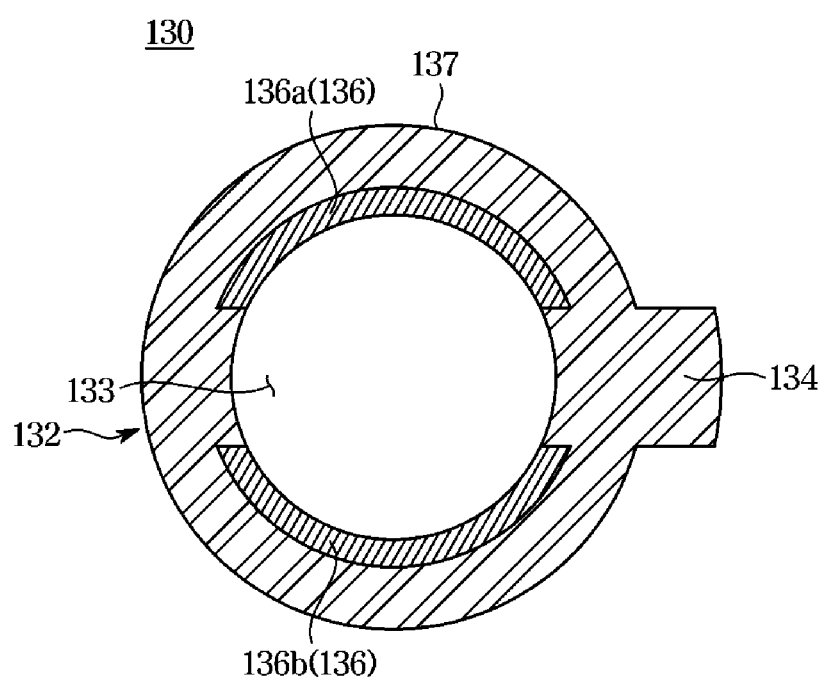
FIG. 9 is a cross-sectional view illustrating a portion inserted into an input jack of the second connector shown in FIG. 8.

FIG. 6 is a view of a connector configured to be connected to a low power capacity electronic device, and a high power capacity electronic device. FIG. 7 is a cross-sectional view illustrating a portion inserted into an input jack of the connector shown in FIG. 6. FIG. 8 is a view of a connector configured to be connected to a low power capacity electronic device. FIG. 9 is a cross-sectional view illustrating a portion inserted into an input jack of the connector shown in FIG. 8.

The electronic system 1 according to an embodiment of the disclosure may include the connectors 120 and 130 that are different from each other according to the capacity of the required power of the electronic device 10. Hereinafter for convenience of description, the connector 120 configured to be applicable to both of the low power capacity electronic device 10 and the high power capacity electronic device 10 is referred to as a first connector 120, and the connector 130 configured to be applicable to only the low power capacity electronic device 10 is referred to as a second connector 130. The first adapter terminals 126 and 136 to be described below may include a first a (1a) adapter terminal 126 of the first connector 120 and a first b (1b) adapter terminal 136 of the second connector 130.

Referring to FIGS. 6 and 7, the first connector 120 configured to be compatible with both of the low power capacity electronic device 10 and the high power capacity electronic device 10 may cover a voltage of the first capacity, and a voltage of the second capacity. The first connector 120 may be arranged at one end of the adapter 20. The first connector 120 may transmit power to the electronic device 10 by being connected to the electronic device 10. The first connector 120 may include a first connector case 121, a first connector body 122, a first hollow (hollow portion/part) 123, the first a (1a) adapter terminal 126, and a second adapter terminal 127.

The first connector case 121 may be arranged at one end of the first connector 120 and may cover a connection portion between the power cable 21 and the first connector body 122.

The first connector body 122 may include the first hollow 123 to which the center pole 113 is inserted. The center pole 113 may be rotatably inserted into the first hollow 123. The first connector body 122 may have a cylindrical shape having a hollow.

The first a (1a) adapter terminal 126 may be configured to be electrically connected to the first input terminal 116 when the first connector 120 is connected to the low power capacity electronic device 10. The first a (1a) adapter terminal 126 may be electrically connected to the first input terminal 116 upon being connected to the relatively low power capacity electronic device 10. The first input terminal 116 may be connected to the power converter 16a to transmit the power supply voltage, which is received from the first a (1a) adapter terminal 126, to the power converter 16a. The first a (1a) adapter terminal 126 may be arranged on an inner circumferential surface of the first connector body 122 in the radial direction.

The first a (1a) adapter terminal 126 may include a first a (1a) positive adapter terminal 126a and a first a (1a) negative adapter terminal 126b. The first a (1a) positive adapter terminal 126a may be provided in plural. The first a (1a) negative adapter terminal 126b may be provided in plural.

The second adapter terminal 127 may be configured to be electrically connected to the second input terminal 117. When the electronic device 10 requires the second capacity, the power converter 16a may be electrically connected to the second input terminal 117, and the second input terminal 117 may be electrically connected to the second adapter terminal 127. The second adapter terminal 127 may be arranged on an outer circumferential surface of the first connector body 122 in the radial direction.

The second adapter terminal 127 may include a second positive adapter terminal 127a and a second negative adapter terminal 127b. The second positive adapter terminal 127a may be provided in plural. The second negative adapter terminal 127b may be provided in plural.

The first connector 120 may include a first guide protrusion 124. Details of the first guide protrusion 124 will be described later.

Because the first connector 120 may be used for both the low power capacity electronic device 10 and the high power capacity electronic device 10 due to this configuration, it is possible to facilitate inventory management and reduce inventory lost.

Referring to FIGS. 8 and 9, the second connector 130 configured to be applicable to only the electronic device 10 shown in FIG. 4 may cover the first capacity corresponding to the relatively low power capacity. The second connector 130 may be arranged at one end of the adapter 20 in which the first connector 120 may be located. The second connector 130 may be connected to the electronic device 10 to transmit power to the electronic device 10. The second connector 130 may include a second connector case 131, the second connector body 132, the second center groove 133, the first b (1b) adapter terminal 136, and a blocking portion 137.

The second connector case 131 may be arranged at one end of the second connector 130 and may cover a connection portion between the power cable 21 and the second connector body 132.

The second connector body 132 may include the second center groove 133 to which the center pole 113 is inserted. The center pole 113 may be rotatably inserted into the second center groove 133. The second connector body 132 may have a cylindrical shape having a hollow portion/part.

The first b (1b) adapter terminal 136 may be configured to be electrically connected to the first input terminal 116 when the second connector 130 is connected to the low power capacity electronic device 10. The first b (1b) adapter terminal 136 may be electrically connected to the first input terminal 116 upon being connected to the relatively low power capacity electronic device 10. The first input terminal 116 may be connected to the power converter 16a to transmit the power supply voltage, which is received from the first b (1b) adapter terminal 136, to the power converter 16a. The first b (1b) adapter terminal 136 may be arranged on an inner circumferential surface of the second connector body 132 in the radial direction.

The first b (1b) adapter terminal 136 may include a first b (1b) positive adapter terminal 136a, and a first b (1b) negative adapter terminal 136b. The first b (1b) positive adapter terminal 136a may be provided in plural. The first b (1b) negative adapter terminal 136b may be provided in plural.

The blocking portion 137 may be configured to block an electrical connection between the second input terminal 117 of the input jack 110 and the second connector 130. The blocking portion 137 may be arranged on an outer circumferential surface of the second connector body 132 in the radial direction. The blocking portion 137 may be provided as the outer circumferential surface of the second connector body 132. Despite being connected to the high power capacity electronic device 10, the blocking portion 137 may prevent the power converter 16a corresponding to the relatively high power capacity, from being electrically connected to the second connector 130. The blocking portion 137 may be provided as a non-conductor.

The second connector 130 may include a second guide protrusion 134. Details of the second guide protrusion 134 will be described later.

In the electronic device 10 according to an embodiment of the disclosure, because the input jack 110 has a single structure, the efficiency of production may be increased. In addition, when connecting the first connector 120 or the second connector 130 to the input jack 110 according to the required capacity of the electronic device 10, it is possible to prevent the electrical connection providing the capacity that does not correspond to the electronic device 10, and thus the use stability may be increased. Particularly, it is possible to prevent the high power capacity from being provided to the low power capacity electronic device 10.

Figure 10:
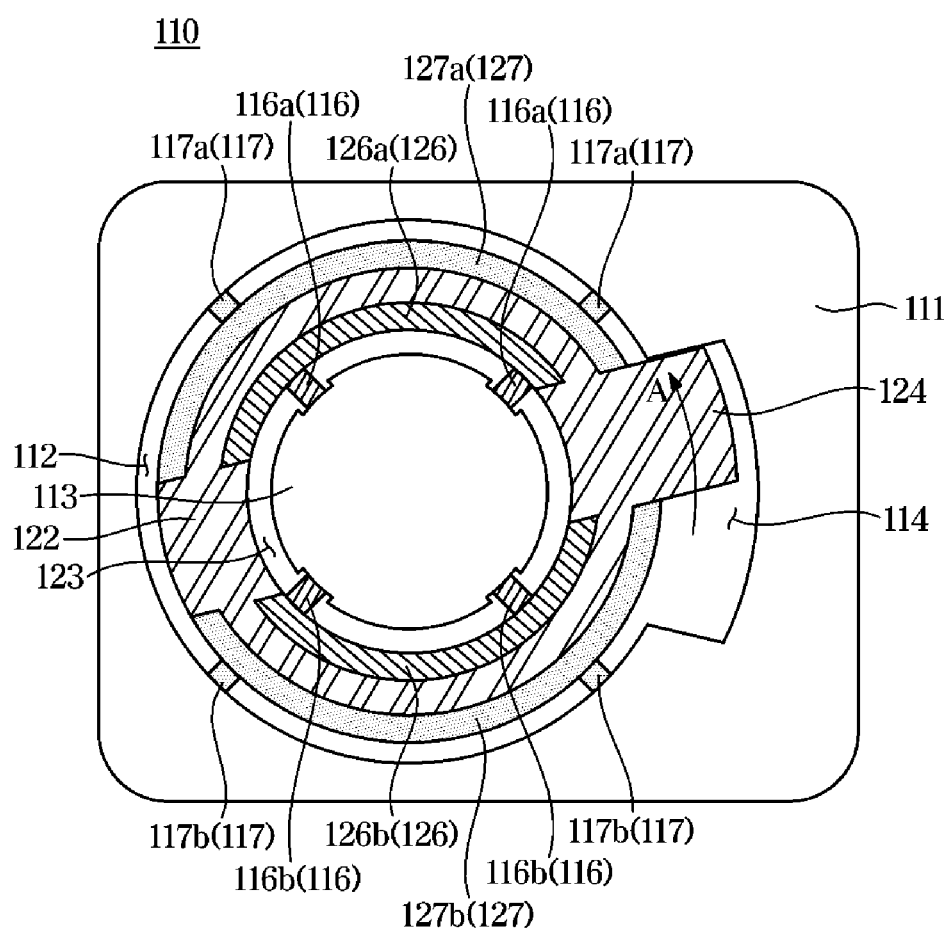
FIG. 10 is a cross-sectional view illustrating a state in which the first connector shown in FIG. 6 is inserted into the input jack shown in FIG. 4 and rotated in a A direction.
Figure 11:
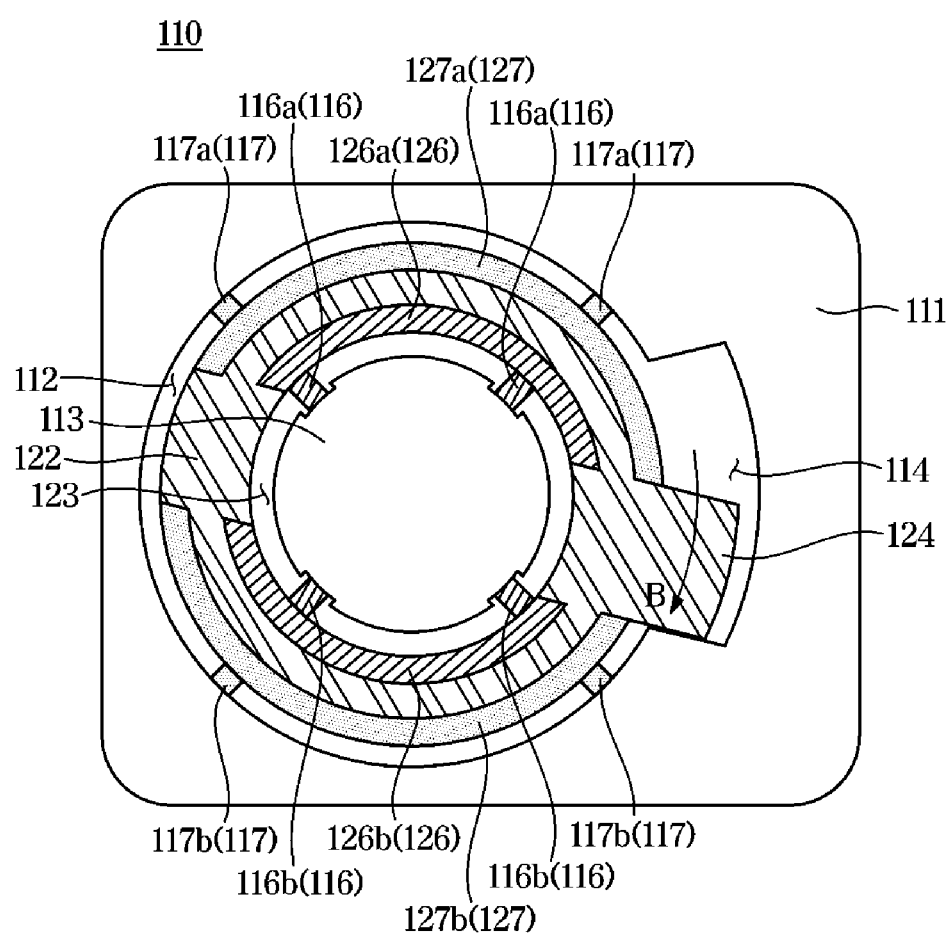
FIG. 11 is a cross-sectional view illustrating a state in which the first connector shown in FIG. 10 is rotated in a B direction.

FIG. 10 is a cross-sectional view illustrating a state in which the connector shown in FIG. 6 is inserted into the input jack shown in FIG. 4 and rotated in a A direction. FIG. 11 is a cross-sectional view illustrating a state in which the connector shown in FIG. 10 is rotated in a B direction.

The first connector 120 and second connector 130 configured to be rotatably inserted into the input jack 110 will be described with reference to FIGS. 10 and 11. Although FIGS. 10 and 11 illustrate the first connector 120, the second connector 130 may be inserted into the input jack 110 and operated as the same as the first connector 120.

The guide groove 114 may have a shape in which a portion of the insertion groove 112 is recessed toward the radially outer side of the insertion groove 112. The guide groove 114 may be configured to limit a rotation range of the first connector 120. The guide groove 114 may be configured to allow the rotation of the first connector 120 to be within a range in which the first connector 120 maintains an electrical connection with the input jack 110.

The first guide protrusion 124 may protrude from the first connector body 122 of the first connector 120. The first guide protrusion 124 may be inserted into the guide groove 114. The first guide protrusion 124 may be rotatable by a predetermined angle about the center pole 113 in the guide groove 114.

The second guide protrusion 134 may protrude from the second connector body 132 of the second connector 130. The second guide protrusion 134 may be inserted into the guide groove 114. The second guide protrusion 134 may be rotatable by a predetermined angle about the center pole 113 in the guide groove 114.

With this configuration, the first connector 120 or the second connector 130 may be rotatable by a predetermined angle while being inserted into the input jack 110. Accordingly, even when the first connector 120 or the second connector 130 is connected to the input jack 110 of the electronic device 10, it is possible to minimize interference with other cables. Therefore, the electronic device 10 may increase convenience of use.

Figure 12:
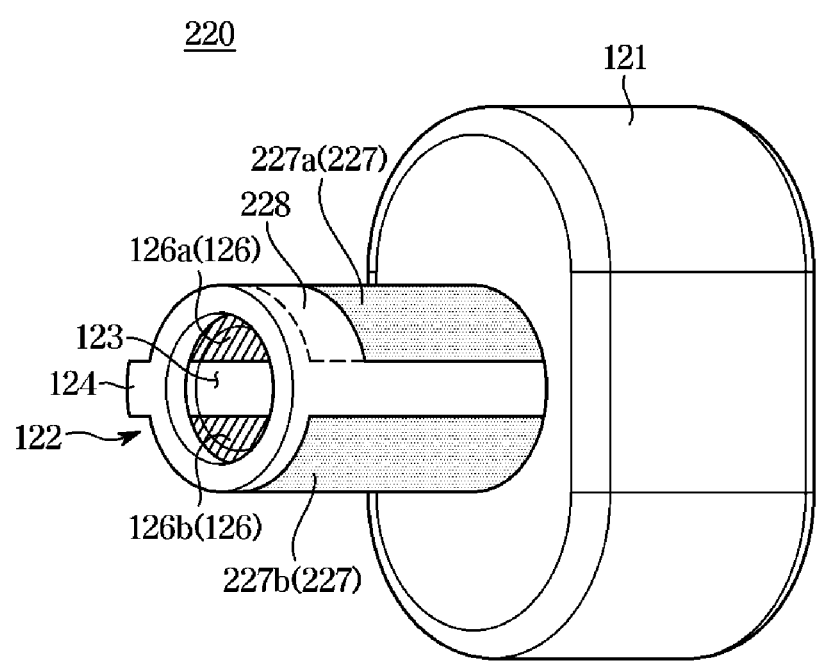
FIG. 12 is a view of a first connector according to an embodiment of the disclosure.

FIG. 12 is a view of a first connector according to another embodiment of the disclosure.

In describing a first connector 220 shown in FIG. 12, the same components as those in the embodiment shown in FIGS. 6 and 7 have the same reference numerals, and detailed descriptions thereof may be omitted.

A first connector 220 may be configured to be compatible with the high power capacity electronic 10 as well as the low power capacity electronic 10, such as the first connector 120 illustrated in FIGS. 6 and 7. That is, the first connector 220 may have a structure similar to that of the first connector 120, but may have a second adapter terminal 227.

When the first connector 220 is inserted into an insertion groove 112, a second negative adapter terminal 227b may be in contact with the second input terminal 117 before a second positive adapter terminal 227a. The connector 220 may include a non-conductive portion 228 arranged at an end portion with respect to a direction in which the second positive adapter terminal 126a is inserted into the insertion groove 112, on an outer circumferential surface on which the second positive adapter terminal 126a. The non-conductive portion 228 may cover a portion of the second positive adapter terminal 227a. The non-conductive portion 228 may be provided to cover a portion of the second positive adapter terminal 226a to block the electrical connection with the second input terminal 117. The non-conductive portion 228 may be provided as a part of the outer circumferential surface of the first connector body 122.

Figure 13:
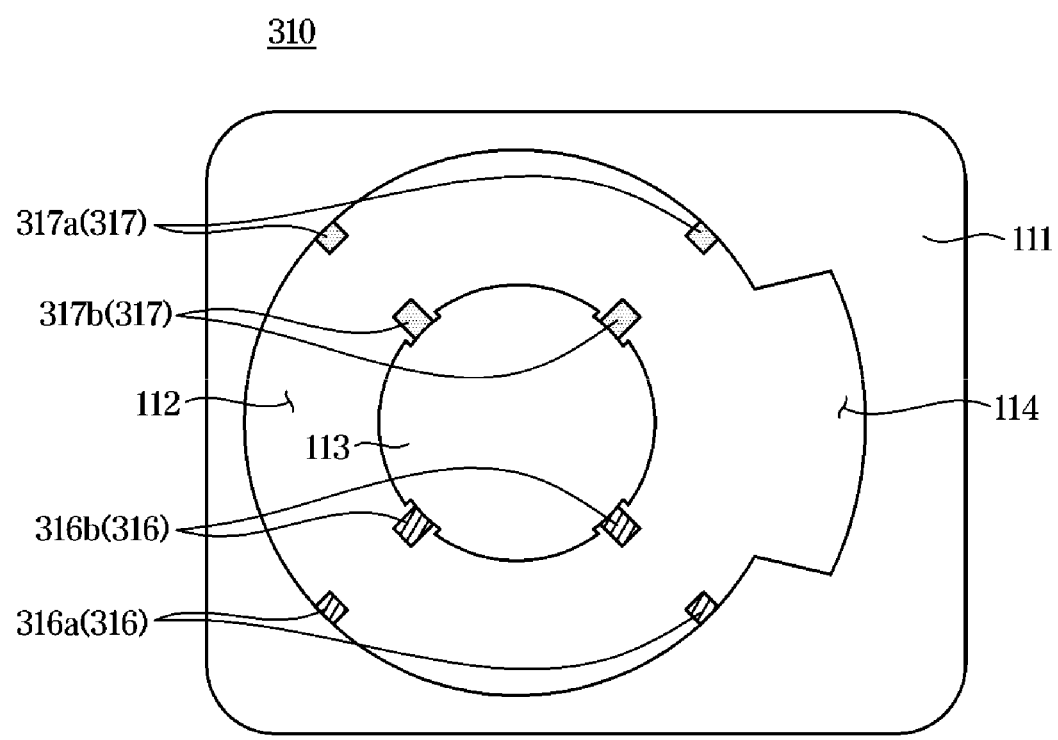
FIG. 13 is a plan view of an input jack according to an embodiment of the disclosure.
Figure 14:
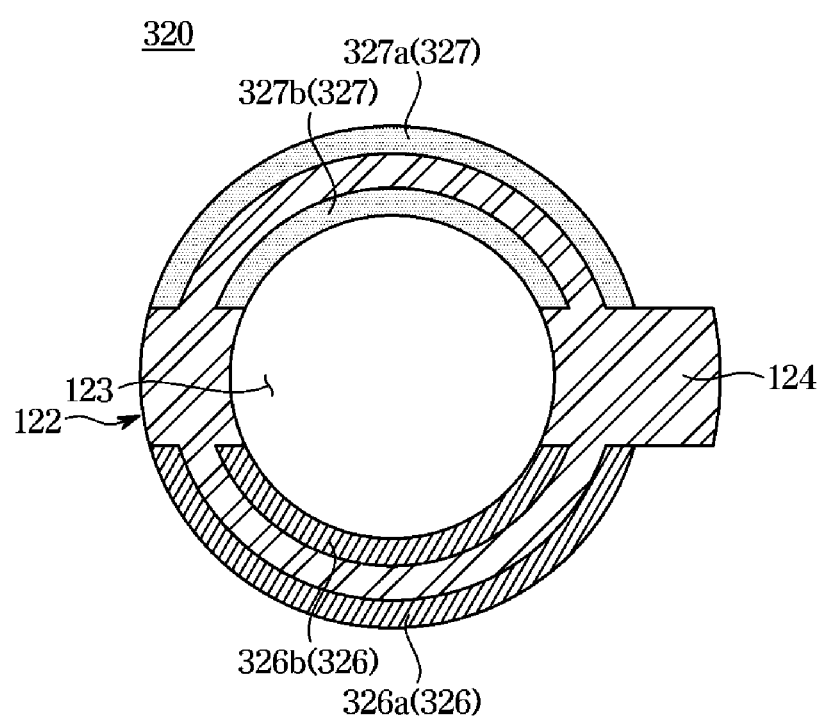
FIG. 14 is a cross-sectional view illustrating a portion inserted into an input jack of a first connector configured to be compatible with the input jack shown in FIG. 13.
Figure 15:
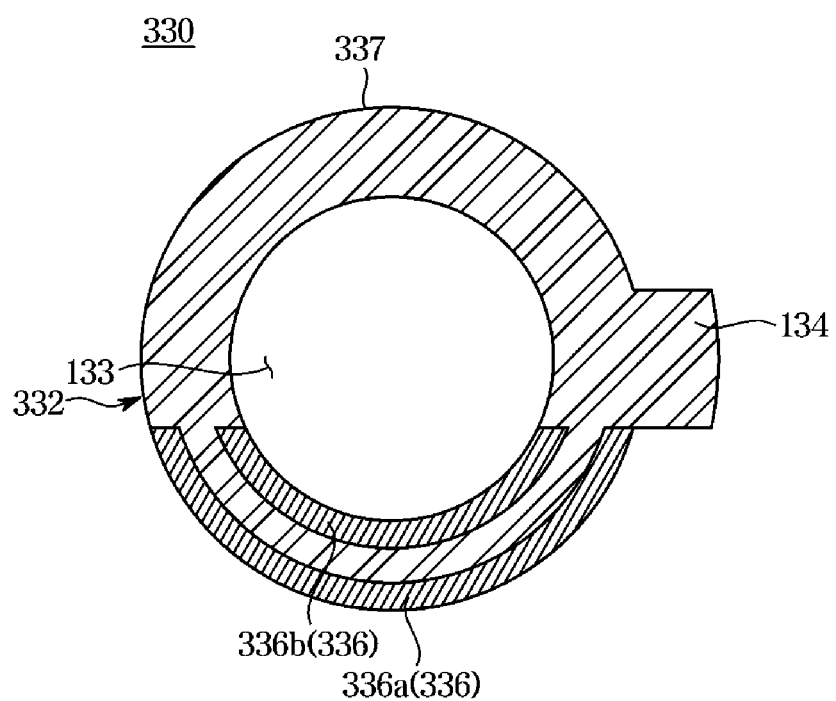
FIG. 15 is a cross-sectional view illustrating a portion inserted into an input jack of a second connector configured to be compatible with the input jack of FIG. 13.

FIG. 13 is a plan view of an input jack according to another embodiment of the disclosure. FIG. 14 is a cross-sectional view illustrating a portion inserted into an input jack of a connector configured to be compatible with the input jack shown in FIG. 13. FIG. 15 is a cross-sectional view illustrating a portion inserted into an input jack of a connector configured to be compatible with the input jack of FIG. 13.

In describing an input jack 310, a first connector 320, and a second connector 330 shown in FIGS. 13 to 15, the same components as those in the embodiment shown in FIGS. 4 and 9 have the same reference numerals, and detailed descriptions thereof may be omitted.

A first input terminal 316 of the input jack 310 may be arranged on one side of a guide groove 114 in the circumferential direction of an insertion groove 112. The first input terminal 316 may include a first positive input terminal 316a arranged on the inner circumferential surface of the insertion groove 112, and a first negative input terminal 316b arranged on the outer circumferential surface of the center pole 113.

A second input terminal 317 of the input jack 310 may be arranged on the other side opposite to one side of the guide groove 114 in the circumferential direction of the insertion groove 112. The second input terminal 317 may include a second positive input terminal 317a arranged on the inner circumferential surface of the insertion groove 112, and a second negative input terminal 317b arranged on the outer circumferential surface of the center pole 113.

In order to correspond to the above-mentioned configuration, referring to FIG. 14, a first adapter terminal 326 of the first connector 320 may be arranged on one side of a first guide protrusion 124 in the circumferential direction of the first connector body 122. A first a (1a) positive adapter terminal 326a of the first a (1a) adapter terminal 326 may be arranged on an outer circumferential surface of the first connector body 122. A first a (1a) negative adapter terminal 326b of the first a (1a) adapter terminal 326 may be arranged on an inner circumferential surface of the first connector body 122.

A second adapter terminal 327 of the first connector 320 may be arranged on the other side opposite to one side of the first guide protrusion 124 along the circumferential direction of the first connector body 122. A second positive adapter terminal 327a of the second adapter terminal 327 may be arranged on an outer circumferential surface of the first connector body 122. A second negative adapter terminal 327b of the second adapter terminal 327 may be arranged on an inner circumferential surface of the first connector body 122.

Accordingly, because the first a (1a) positive adapter terminal 326a and the second positive adapter terminal 327a are arranged on the outer circumferential surface of the connector body 122 that can be touched by a user, it is possible to prevent the current from flowing although the user is in contact with the first connector 320.

With this configuration, when the input jack 310 is provided in the low power capacity electronic device 10, the power converter 16a may be electrically connected to the first input terminal 316, and the first connector 320 may supply the power to the electronic device 10 through the first adapter terminal 326 electrically connected to the first input terminal 316.

On the other hand, when the input jack 310 is provided in the high power capacity electronic device 10, the power converter 16a may be electrically connected to the second input terminal 317, and the first connector 320 may supply the power to the electronic device 10 through the second adapter terminal 327 electrically connected to the second input terminal 317.

Further, referring to FIG. 15, a first adapter terminal 336 of the second connector 330 may be arranged on one side of the second guide protrusion 134 along the circumferential direction of a second connector body 332. A first b (1b) positive adapter terminal 336a of the first b (1b) adapter terminal 336 may be arranged on an outer circumferential surface of the second connector body 332. A first b (1b) negative adapter terminal 336b of the first b (1b) adapter terminal 336 may be arranged on an inner circumferential surface of the second connector body 332.

A blocking portion 337 of the second connector 330 may be arranged on the other side opposite to the one side at which, the first b (1b) adapter terminal 336 of the second guide protrusion 134 is arranged, along the circumferential direction of the second connector body 332. The blocking portion 337 may be configured to block the electrical connection between the second input terminal 317 of the input jack 310 and the second connector 330. The blocking portion 337 may be arranged on one side of the outer circumferential surface of the second connector body 332 in the radial direction. The blocking portion 337 may be provided as an outer circumferential surface of the second connector body 332.

With this configuration, when the input jack 310 is provided in the low power capacity electronic device 10, the power converter 16a may be electrically connected to the first input terminal 316, and the second connector 330 may supply the power to the electronic device 10 through the first b (1b) adapter terminal 336 electrically connected to the first input terminal 316.

On the other hand, when the input jack 310 is provided in the high power capacity electronic device 10, the power converter 16a may be electrically connected to the second input terminal 317, and the second connector 330 may be not electrically connected to the relatively high power capacity electronic device 10. The blocking portion 337 may be provided as a non-conductor.

Figure 16:
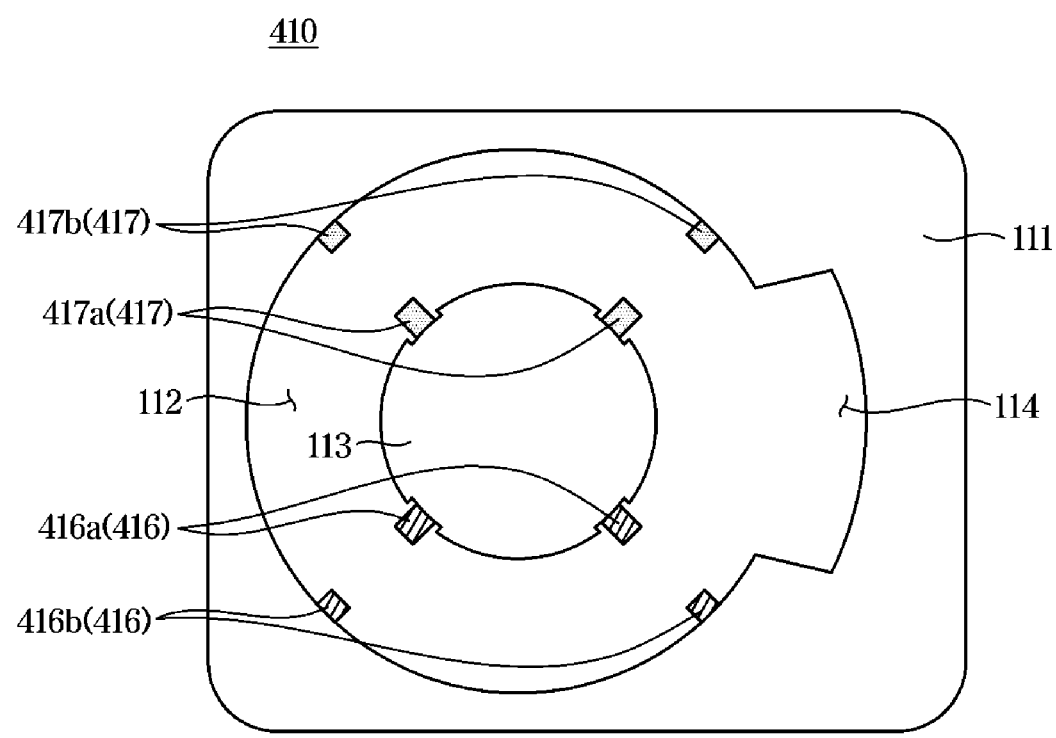
FIG. 16 is a plan view of an input jack according to an embodiment of the disclosure.
Figure 17:
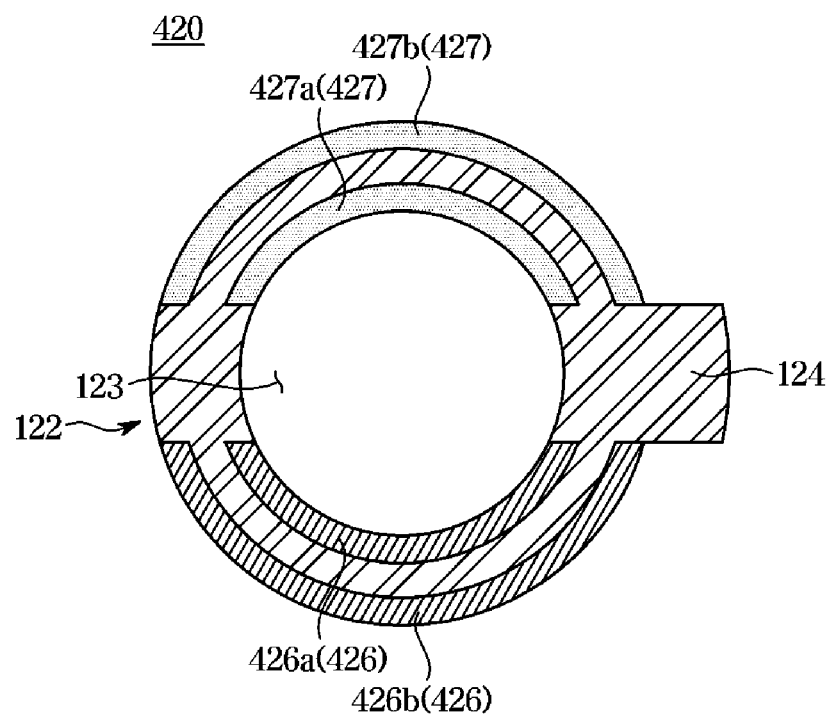
FIG. 17 is a cross-sectional view illustrating a portion inserted into an input jack of a first connector configured to be compatible with the input jack shown in FIG. 16.
Figure 18:
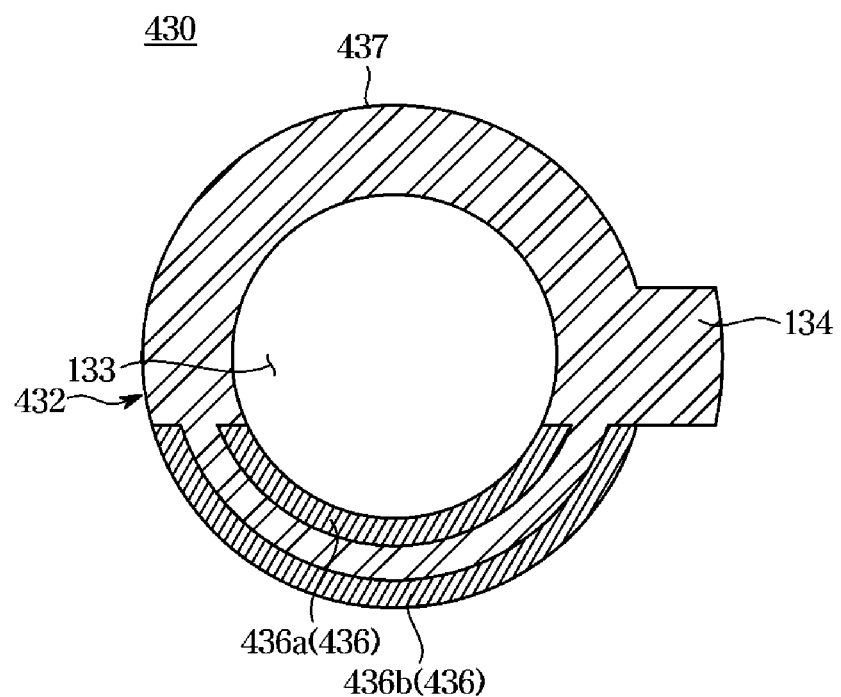
FIG. 18 is a cross-sectional view illustrating a portion inserted into an input jack of a second connector configured to be compatible with the input jack of FIG. 16.

FIG. 16 is a plan view of an input jack according to still another embodiment of the disclosure. FIG. 17 is a cross-sectional view illustrating a portion inserted into an input jack of a first connector configured to be compatible with the input jack shown in FIG. 16. FIG. 18 is a cross-sectional view illustrating a portion inserted into an input jack of a second connector configured to be compatible with the input jack of FIG. 16.

In describing an input jack 410, a first connector 420, and a second connector 430 shown in FIGS. 16 to 18, the same components as those in the embodiment shown in FIGS. 4 and 9 have the same reference numerals, and detailed descriptions thereof may be omitted.

A first input terminal 416 of the input jack 410 may be arranged on one side of a guide groove 114 in the circumferential direction of an insertion groove 112. The first input terminal 416 may include a first negative input terminal 416b arranged on an inner circumferential surface of the insertion groove 112 and a first positive input terminal 416a arranged on an outer circumferential surface of the center pole 113. That is, the arrangement of the pole (e.g., positive pole or negative pole) of the first input terminal 416 may be opposite to the embodiment shown in FIG. 13.

A second input terminal 417 of the input jack 410 may be arranged on the other side opposite to one side of the guide groove 114 in the circumferential direction of the insertion groove 112. The second input terminal 417 may include a second negative input terminal 417b arranged on the inner circumferential surface of the insertion groove 112, and a second positive input terminal 417a arranged on the outer circumferential surface of the center pole 113.

In order to correspond to the above-mentioned configuration, referring to FIG. 16, a first adapter terminal 426 of the first connector 420 may be arranged on one side of a first guide protrusion 124 in the circumferential direction of the first connector body 122. A first a (1a) positive adapter terminal 426a of the first a (1a) adapter terminal 426 may be arranged on an inner circumferential surface of the first connector body 122. A first a (1a) negative adapter terminal 426b of the first a (1a) adapter terminal 426 may be arranged on an outer circumferential surface of the first connector body 122. That is, the arrangement of the pole (e.g., positive pole or negative pole) of the first adapter terminal 426 may be opposite to the embodiment shown in FIG. 14.

A second adapter terminal 427 of the first connector 420 may be arranged on the other side opposite to one side of the first guide protrusion 124 along the circumferential direction of the first connector body 122. A second positive adapter terminal 427a of the second adapter terminal 427 may be arranged on the inner circumferential surface of the first connector body 122. A second negative adapter terminal 427b of the second adapter terminal 427 may be arranged on the outer circumferential surface of the first connector body 122. That is, the arrangement of the pole (e.g., positive pole or negative pole) of the second adapter terminal 427 may be opposite to the embodiment shown in FIG. 14.

Accordingly, because the first a (1a) negative adapter terminal 426b and the second negative adapter terminal 427b are arranged on the outer circumferential surface of the connector body 122 that can be touched by a user, it is possible to prevent the current from flowing although the user is in contact with the first connector 420.

With this configuration, when the input jack 410 is provided in the low power capacity electronic device 10, the power converter 16a may be electrically connected to the first input terminal 416, and the first connector 420 may supply the power to the electronic device 10 through the first adapter terminal 426 electrically connected to the first input terminal 416.

On the other hand, when the input jack 410 is provided in the high power capacity electronic device 10, the power converter 16a may be electrically connected to the second input terminal 417, and the first connector 420 may supply the power to the electronic device 10 through the second adapter terminal 427 electrically connected to the second input terminal 417.

Further, referring to FIG. 18, a first adapter terminal 436 of the second connector 430 may be arranged on one side of the second guide protrusion 134 along the circumferential direction of a second connector body 432. A first b (1b) positive adapter terminal 436a of the first b (1b) adapter terminal 436 may be arranged on an inner circumferential surface of the second connector body 432. A first b (1b) negative adapter terminal 436b of the first b (1b) adapter terminal 436 may be arranged on an outer circumferential surface of the second connector body 432.

A blocking portion 437 of the second connector 430 may be arranged on the other side opposite to the one side at which, the first b (1b) adapter terminal 436 of the second guide protrusion 134 is arranged, along the circumferential direction of the second connector body 432. The blocking portion 437 may be configured to block the electrical connection between the second input terminal 417 of the input jack 410 and the second connector 430. The blocking portion 437 may be arranged on one side of the outer circumferential surface of the second connector body 432 in the radial direction. The blocking portion 437 may be provided as an outer circumferential surface of the second connector body 432.

With this configuration, when the input jack 410 is provided in the low power capacity electronic device 10, the power converter 16a may be electrically connected to the first input terminal 416, and the second connector 430 may supply the power to the electronic device 10 through the first b (1b) adapter terminal 436 electrically connected to the first input terminal 416.

On the other hand, when the input jack 410 is provided in the high power capacity electronic device 10, the power converter 16a may be electrically connected to the second input terminal 417, and the second connector 430 may be not electrically connected to the relatively high power capacity electronic device 10. The blocking portion 437 may be provided as a non-conductor.

Figure 19:
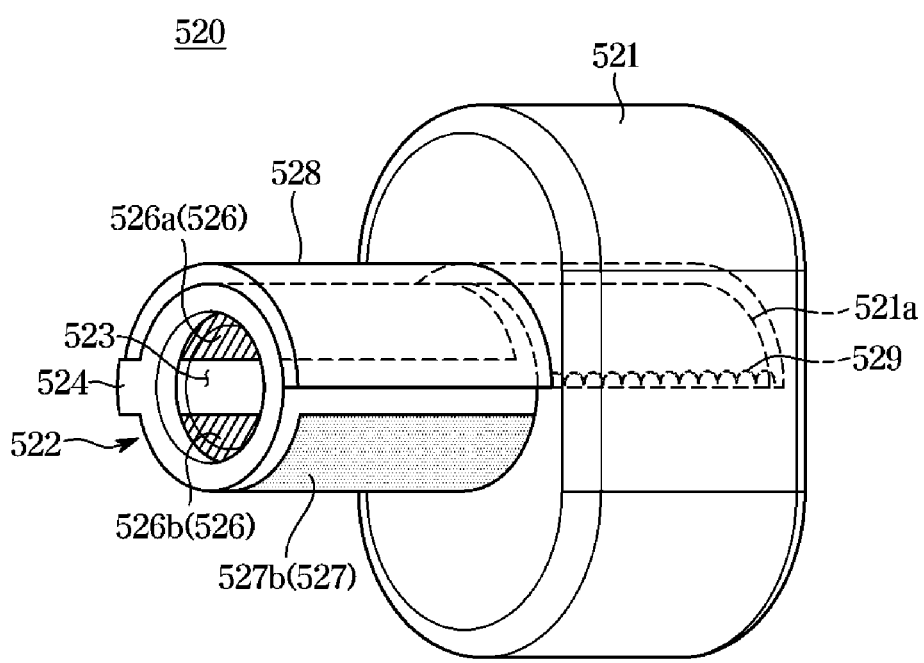
FIG. 19 is a view illustrating a state in which a terminal cover of the first connector according to an embodiment of the disclosure covers a terminal.
Figure 20:
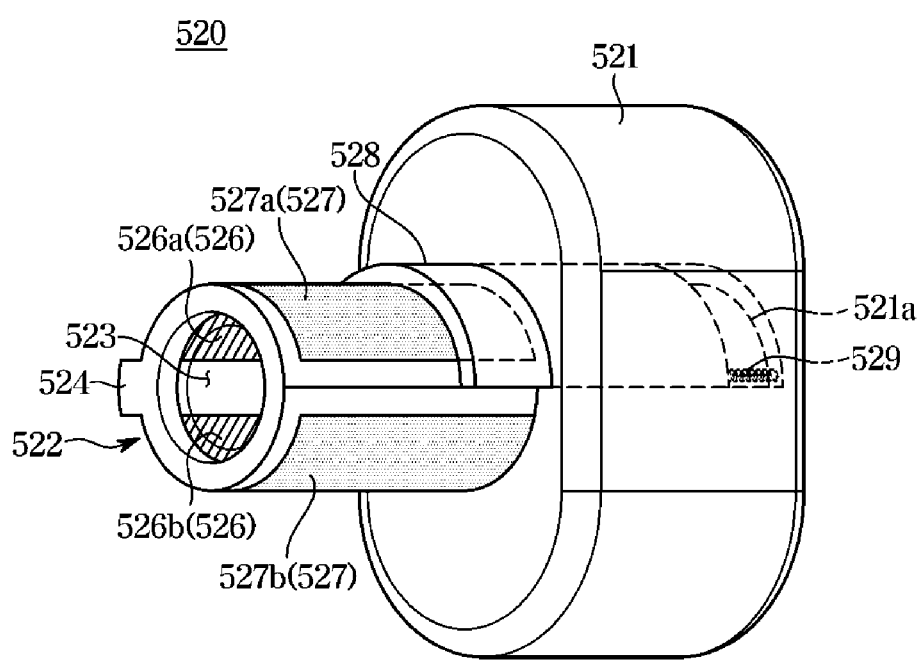
FIG. 20 is a view illustrating a state in which the terminal cover of the first connector according to an embodiment of the disclosure exposes the terminal.

FIG. 19 is a view illustrating a state in which a terminal cover of the first connector according to still another embodiment of the disclosure covers a terminal. FIG. 20 is a view illustrating a state in which the terminal cover of the first connector according to still another embodiment of the disclosure exposes the terminal.

In describing, a first connector 520 shown in FIGS. 19 and 20, the same components as those in the embodiment shown in FIG. 6 have the same reference numerals, and detailed descriptions thereof may be omitted Referring to FIGS. 19 and 20, the first connector 520 may be configured to receive both of a voltage of the first capacity, and a voltage of the second capacity. The first connector 520 may include a first connector case 521, a first connector body 522, a first center groove 523, the first a (1a) adapter terminal 526, and a second adapter terminal 527.

The first a (1a) adapter terminal 526 may be configured to be electrically connected to the first input terminal 116 when the first connector 520 is connected to the low power capacity electronic device 10. The first a (1a) adapter terminal 526 may be electrically connected to the first input terminal 116 upon being connected to the relatively low power capacity electronic device 10. The first input terminal 116 may be connected to the power converter 16a to transmit the power supply voltage, which is received from the first a (1a) adapter terminal 526, to the power converter 16a. The first a (1a) adapter terminal 526 may be arranged on an inner circumferential surface of the first connector body 522 in the radial direction.

The first a (1a) adapter terminal 526 may include a first a (1a) positive adapter terminal 526a and a first a (1a) negative adapter terminal 526b. The first a (1a) positive adapter terminal 526a may be provided in plural. The first a (1a) negative adapter terminal 526b may be provided in plural.

The second adapter terminal 527 may be configured to be electrically connected to the second input terminal 117. When the electronic device 10 requires the second capacity, the power converter 16a may be electrically connected to the second input terminal 117, and the second input terminal 117 may be electrically connected to the second adapter terminal 527. The second adapter terminal 527 may be arranged on an outer circumferential surface of the first connector body 522 in the radial direction.

The second adapter terminal 527 may include a second positive adapter terminal 527a and a second negative adapter terminal 527b. The second positive adapter terminal 527a may be provided in plural. The second negative adapter terminal 527b may be provided in plural.

The first connector 520 may include a first guide protrusion 524.

Because the first connector 520 may be used for both the low power capacity electronic device 10 and the high power capacity electronic device 10 due to this configuration, it is possible to facilitate inventory management and reduce inventory lost.

The first connector 520 may include a terminal cover 528 configured to cover the second positive adapter terminal 527a. The terminal cover 528 may be inserted into or taken out from a cover groove 521a formed in the first connector case 521. The terminal cover 528 may be elastically biased in the direction to be taken out of the cover groove 521a by an elastic member 529. The elastic member 529 may be provided in plural to elastically support both ends of the rear surface of the terminal cover 528.

The terminal cover 528 may be in a position to cover the second positive adapter terminal 527a by the elastic member 529 when the first connector 520 is not coupled to the input jack 110.

The terminal cover 528 may be in a position to expose the second positive adapter terminal 527a to the outside when the first connector 520 is coupled to the input jack 110. Particularly, when the first connector 520 is coupled to the input jack 110, the terminal cover 528 may be pressed in the direction in which the jack cover 111 is inserted into the cover groove 521a by the jack body 111. As the terminal cover 528 is inserted into the cover groove 521a, the elastic member 529 may be contracted, and the second positive adapter terminal 527a may be exposed to the outside so as to be electrically connected to the second positive input terminal 117a.

When the first connector 520 is separated from the input jack 110, the terminal cover 528 may be moved to the position covering the second positive adapter terminal 527a again by the elastic force of the elastic member 529.

With this configuration, the first connector 520 may prevent a user from being in contact with the second adapter terminal 527.

As is apparent from the above description, because the electronic system may prevent the electrical connection even when an inappropriate adapter is connected to the electronic device, it may be possible to prevent an accident due to improper use.

When the adapter is connected to the electronic device, the connector of the adapter may be rotated by a predetermined angle with respect to the electronic device, thereby increasing convenience of use.

Because a single input jack is compatible with a relatively low power capacity power supply and low power capacity adapter, and a relatively high power capacity power supply and high power capacity adapter, it may be possible to facilitate inventory management.

Because the connector of the high power capacity adapter is compatible with the low power capacity power supply, it may be possible to facilitate inventory management.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An adapter comprising:
a converter;
a connector configured to be connected to an electronic device; and
a power cable provided to electrically connect the converter and the connector,
wherein the connector includes:
a connector body formed in a cylindrical shape where inside a circumference of the connector body is a hollow portion;
a first adapter terminal arranged along a circumferential surface of the hollow portion of the connector body; and
a second adapter terminal arranged along the circumferential surface of the connector body, the second adapter is configured to have a power capacity different from a power capacity of the first adapter terminal.

2. The adapter of claim 1, wherein
the connector comprises a guide protrusion configured to radially protrude from the connector body.

3. The adapter of claim 2, wherein the first adapter terminal comprises:
a first positive adapter terminal arranged on one side of the guide protrusion along the circumferential surface of the hollow portion of the connector body, and
a first negative adapter terminal arranged on another side of the guide protrusion along the circumferential surface of the hollow portion of the connector body.

4. The adapter of claim 2, wherein the second adapter terminal comprises:
a second positive adapter terminal arranged on one side of the guide protrusion along the circumferential surface of the connector body, and
a second negative adapter terminal arranged on another side of the guide protrusion along the circumferential surface of the connector body.

5. The adapter of claim 4, wherein
before the second positive adapter terminal is connected, the second negative adapter terminal is inserted into the electronic device.

6. The adapter of claim 5, wherein
a length of the second positive adapter terminal extending along a longitudinal direction of the connector body is less than a length of the second negative adapter terminal.

7. The adapter of claim 1, wherein
the connector further comprises a terminal cover configured to expose a portion of the second adapter terminal while the connector is inserted into the electronic device.

8. The adapter of claim 1, wherein
the power capacity of the second adapter terminal is larger than the power capacity of the first terminal adapter.

9. An electronic system comprising:
an electronic device provided with an input jack including a first input terminal and a second input terminal having a capacity different from a capacity of the first input terminal; and
an adapter provided to supply power to the electronic device, and including a connector,
the connector including:
  a first adapter terminal configured to be electrically connected to the first input terminal, and
  a second adapter terminal configured to be electrically connected to the second input terminal and configured to have a power capacity different from a power capacity of the first adapter terminal,
wherein the input jack comprises:
  an insertion groove into which the connector is insertable, and a center pole arranged at a center of the insertion groove,
wherein the first input terminal is arranged on an outer circumferential surface of the center pole, and
the second input terminal is arranged on an inner circumferential surface of the insertion groove.

10. The electronic system of claim 9, wherein
when the electronic device requires a first power capacity, the electronic device is supplied with power through the first input terminal, and
when the electronic device requires a second power capacity, the electronic device is supplied with power through the second input terminal.

11. The electronic system of claim 9, wherein
the connector is insertable into the input jack, and comprises a connector body and an inside of which includes a hollow portion,
wherein the first adapter terminal is arranged on a circumferential surface of the hollow portion of the connector body, and
the second adapter terminal is arranged on a circumferential surface of the connector body.

12. The electronic system of claim 11, wherein
the connector comprises a guide protrusion configured to radially protrude from the connector body.

13. The electronic system of claim 12, wherein the first adapter terminal comprises:
  a first positive adapter terminal arranged on one side of the guide protrusion along the circumferential surface of the hollow portion of the connector body, and
  a first negative adapter terminal arranged on another side of the guide protrusion along the circumferential surface of the hollow portion of the connector body.

14. The electronic system of claim 12, wherein the second adapter terminal comprises:
  a second positive adapter terminal arranged on one side of the guide protrusion along the circumferential surface of the connector body, and
  a second negative adapter terminal arranged on another side of the guide protrusion along the circumferential surface of the connector body.

15. The electronic system of claim 12, wherein:
the first adapter terminal is arranged on a side of the guide protrusion along a circumference of the connector body, and
the second adapter terminal is arranged on another side of the guide protrusion along the circumference of the connector body.

16. The electronic system of claim 9, wherein
the second input terminal is provided to have a power capacity larger than a power capacity of the first input terminal.

17. The electronic system of claim 9, wherein the input jack comprises:
  an insertion groove into which the connector is rotatably insertable; and
  a guide groove configured to limit a range of a rotation of the connector.

18. The electronic system of claim 17, wherein
the guide groove is configured to allow the rotation of the connector to be within the range in which the connector maintains an electrical connection with the input jack.

19. The electronic system of claim 17, wherein
the first input terminal is arranged on one side of the guide groove along a circumferential direction of the insertion groove; and
the second input terminal is arranged on another side opposite to the one side of the guide groove along the circumferential direction of the insertion groove.

* * * * *